United States Patent
Birnkrant

(10) Patent No.: US 12,540,744 B2
(45) Date of Patent: Feb. 3, 2026

(54) DUSTING FREQUENCY DETECTION BASED ON AIR CLEANER PERFORMANCE

(71) Applicant: Carrier Corporation, Palm Beach Gardens, FL (US)

(72) Inventor: Michael J. Birnkrant, Manlius, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 522 days.

(21) Appl. No.: 18/055,501

(22) Filed: Nov. 15, 2022

(65) Prior Publication Data

US 2023/0151981 A1 May 18, 2023

Related U.S. Application Data

(60) Provisional application No. 63/301,539, filed on Jan. 21, 2022, provisional application No. 63/264,215, filed on Nov. 17, 2021.

(51) Int. Cl.
| | | |
|---|---|---|
| *B01D 46/00* | (2022.01) | |
| *F24F 8/10* | (2021.01) | |
| *F24F 8/108* | (2021.01) | |
| *F24F 8/22* | (2021.01) | |
| *F24F 11/39* | (2018.01) | |
| *F24F 11/70* | (2018.01) | |
| *F24F 110/64* | (2018.01) | |
| *F24F 140/10* | (2018.01) | |

(52) U.S. Cl.
CPC ............ *F24F 8/108* (2021.01); *B01D 46/00* (2013.01); *B01D 46/0086* (2013.01); *F24F 8/22* (2021.01); *F24F 11/39* (2018.01); *F24F 11/70* (2018.01); *F24F 2110/64* (2018.01); *F24F 2140/10* (2018.01)

(58) Field of Classification Search
CPC ...... B01D 46/00; B01D 46/0086; F24F 8/108
See application file for complete search history.

(56) References Cited

U.S. PATENT DOCUMENTS

| | | | | |
|---|---|---|---|---|
| 6,494,940 B1 * | 12/2002 | Hak | ...................... | B01D 46/10 96/417 |
| 2020/0256578 A1 * | 8/2020 | Meis | .................... | B01D 46/446 |

* cited by examiner

*Primary Examiner* — Robert A Hopkins
(74) *Attorney, Agent, or Firm* — CANTOR COLBURN LLP

(57) ABSTRACT

An air cleaning system includes a housing having an inlet and an outlet, and a filter positioned within the housing, downstream of the inlet. A fan assembly is located within the housing. The fan assembly is in airflow communication with the filter. A sensor is positioned within the housing. The sensor is configured to monitor at least one of a particle size, an accumulation of dust on a surface of the filter, and a pressure drop over the filter. A result of a comparison between a measured dust level at the filter and a dust threshold is communicated to a user.

13 Claims, 3 Drawing Sheets

DUSTING FREQUENCY DETECTION BASED ON AIR CLEANER PERFORMANCE

CROSS-REFERENCE TO RELATED APPLICATIONS

This application claims the benefit of U.S. Provisional Patent Application No. 63/301,539 filed Jan. 21, 2022 and U.S. Provisional Patent Application No. 63/264,215 filed Nov. 17, 2021, the disclosure of which is incorporated herein by reference in its entirety.

BACKGROUND

The present disclosure relates to air cleaning systems. Air cleaners and air cleaning systems are utilized to improve air quality of a room or other space in which the air cleaning system is located. The air cleaning systems achieve this by removing airborne dust and other particulate contaminants from the room. While present air cleaners remove airborne dust and particles from the room, they do not, however, remove dust or particulates from surfaces in the room, the amount of such accumulated dust or particles also having an effect on air quality of the room.

Furthermore, current air cleaning systems do not include features that connect air cleaner performance and a frequency of dusting of the surfaces to remove the dust accumulated on the surfaces. The gap is understanding how much dust is in the room that dictates the dusting frequency.

BRIEF DESCRIPTION

In one embodiment, an air cleaning system includes a housing having an inlet and an outlet, and a filter positioned within the housing, downstream of the inlet. A fan assembly is located within the housing. The fan assembly is in airflow communication with the filter. A sensor is positioned within the housing. The sensor is configured to monitor at least one of a particle size, an accumulation of dust on a surface of the filter, and a pressure drop over the filter. A result of a comparison between a measured dust level at the filter and a dust threshold is communicated to a user.

Additionally or alternatively, in this or other embodiments the result of the comparison is transmitted to a user device via a wireless signal.

Additionally or alternatively, in this or other embodiments the user device is one of a smart phone or tablet.

Additionally or alternatively, in this or other embodiments the result of the comparison includes one or more recommendations for the user.

Additionally or alternatively, in this or other embodiments the one or more recommendations include at least one of changing a frequency of cleaning a room in which the air cleaning system is located, cleaning or replacing the filter, or changing operation of the air cleaning system.

Additionally or alternatively, in this or other embodiments the fan assembly is disposed in the housing downstream of the filter.

Additionally or alternatively, in this or other embodiments the filter is cylindrical.

Additionally or alternatively, in this or other embodiments the filter is one of a spun glass or fiberglass filter, a pleated filter formed from for example cotton or nylon, a high-efficiency particulate air (HEPA) filter, an ultraviolet (UV) light filter, or an electrostatic filter.

Additionally or alternatively, in this or other embodiments the sensor is an optical point sensor.

Additionally or alternatively, in this or other embodiments the optical point sensor is configured to emit light at multiple wavelengths.

In another embodiment, a method of operating an air cleaning system includes urging an airflow from a room through a filter located in a housing, and accumulating dust from the airflow on the filter. A level of dust accumulation on the filter is sensed, and the level of dust accumulation is compared to a threshold. One or more recommendations are made for cleaning of the room and/or operation of the air cleaning system based on the comparison.

Additionally or alternatively, in this or other embodiments the one or more recommendations are transmitted to a user device via a wireless signal.

Additionally or alternatively, in this or other embodiments the user device is one of a smart phone or tablet.

Additionally or alternatively, in this or other embodiments the one or more recommendations include at least one of changing a frequency of cleaning a room in which the air cleaning system is located, cleaning or replacing the filter, or changing operation of the air cleaning system.

Additionally or alternatively, in this or other embodiments the sensing the level of dust includes emitting light from one or more emitters of a sensor toward the filter, receiving a scattered light signal from the filter at one or more detectors of the sensor, and analyzing the scattered light signal at the processor.

Additionally or alternatively, in this or other embodiments the sensor detects one or more of a particle size, an accumulation of dust on a surface of the filter, and a pressure drop over the filter.

Additionally or alternatively, in this or other embodiments the filter is cylindrical.

Additionally or alternatively, in this or other embodiments the filter is one of a spun glass or fiberglass filter, a pleated filter formed from for example cotton or nylon, a high-efficiency particulate air (HEPA) filter, an ultraviolet (UV) light filter, or an electrostatic filter.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

Figure 1:
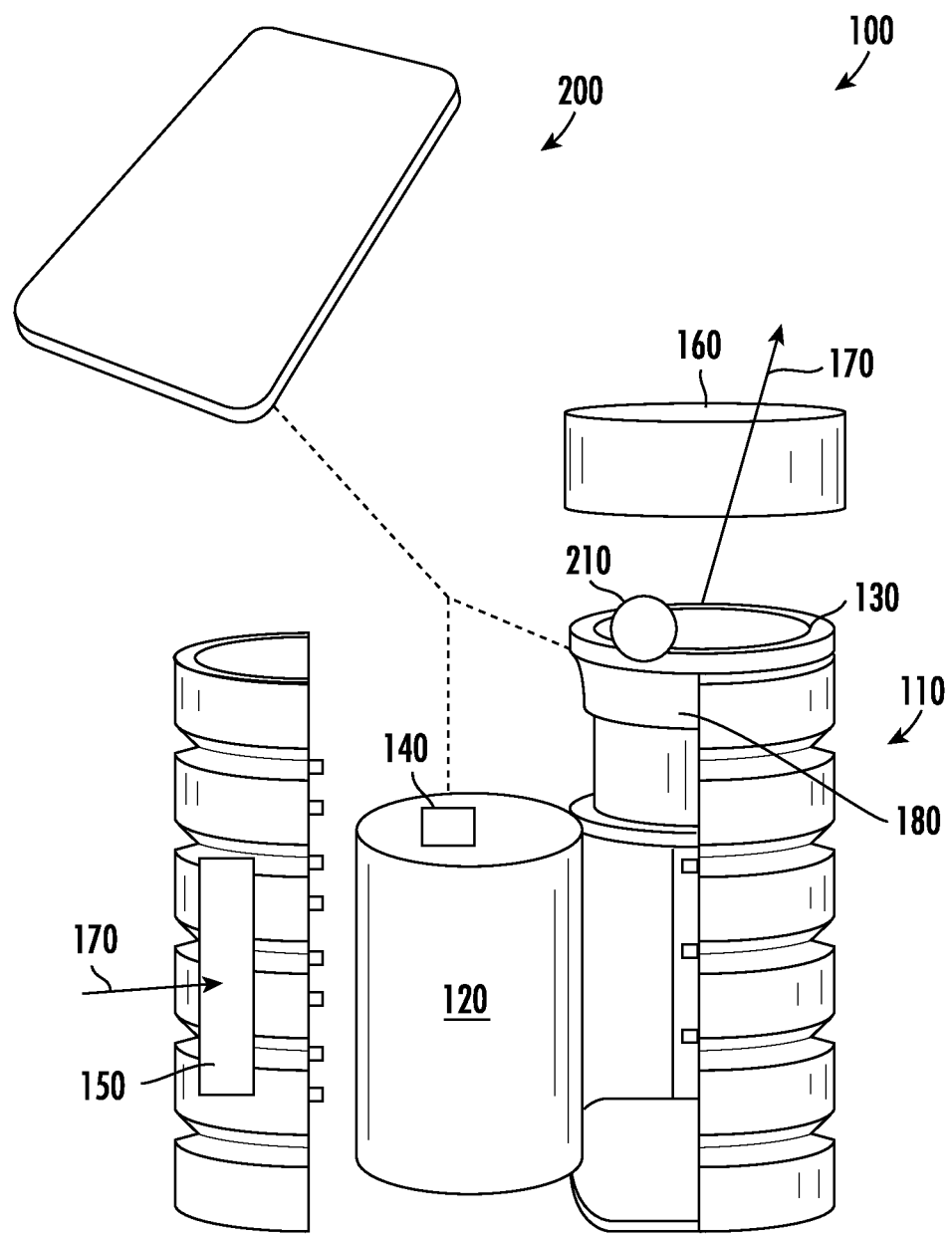
FIG. 1 is a schematic illustration of an exemplary air cleaning system including a filter and a sensor, in accordance with one aspect of the disclosure.

With reference now to the Figures, an exemplary air cleaning system 100 including a housing 110, a filter 120, a fan assembly 130, and a sensor 140 is shown in FIG. 1. The housing 110 includes an air inlet 150 and an air outlet 160. The filter 120 is disposed within the housing 110, downstream of the air inlet 150, and the air outlet 160 is located downstream of the filter 120. It should be appreciated that the terminology "downstream" and "upstream" is relative to the passage of the airflow 170 (e.g., the filter 120 may be considered downstream of the air inlet 150 due to the filter receiving the airflow 170 after the airflow 170 passes through the air inlet 150). In some embodiments, the filter 120 is one of a spun glass or fiberglass filter, a pleated filter formed from for example cotton or nylon, a high-efficiency particulate air (HEPA) filter, an ultraviolet (UV) light filter, or an electrostatic filter. As shown in FIG. 1, in some embodiments the filter 120 is cylindrical in shape, while in other embodiments filters 120 of other shapes, such as rectangular, may be used.

The fan assembly 130 is disposed within the housing 110. The fan assembly 130 is in airflow communication with the filter 120 and with the air outlet 160. In some embodiments, the fan assembly 130 is located between the filter 120 and the air outlet 160. One skilled in the art will readily appreciate, however, that such a location is merely exemplary and in some embodiments the fan assembly 130 may be in another location, such as upstream of the filter 120. An airflow 170 is urged into the housing 110 through the air inlet 150 by operation of the fan assembly 130. The airflow 170 proceeds through the filter 120, where the filter 120 removes dust and/or other contaminants from the airflow 170. For the sake of clarity in the below description dust is used as a term, which may include dust and other particulates in the airflow 170. The dust and/or other contaminants are collected at the filter 120 while the airflow 170 proceeds from the filter 120 and exits the housing 110 through the air outlet 160.

Figure 2:
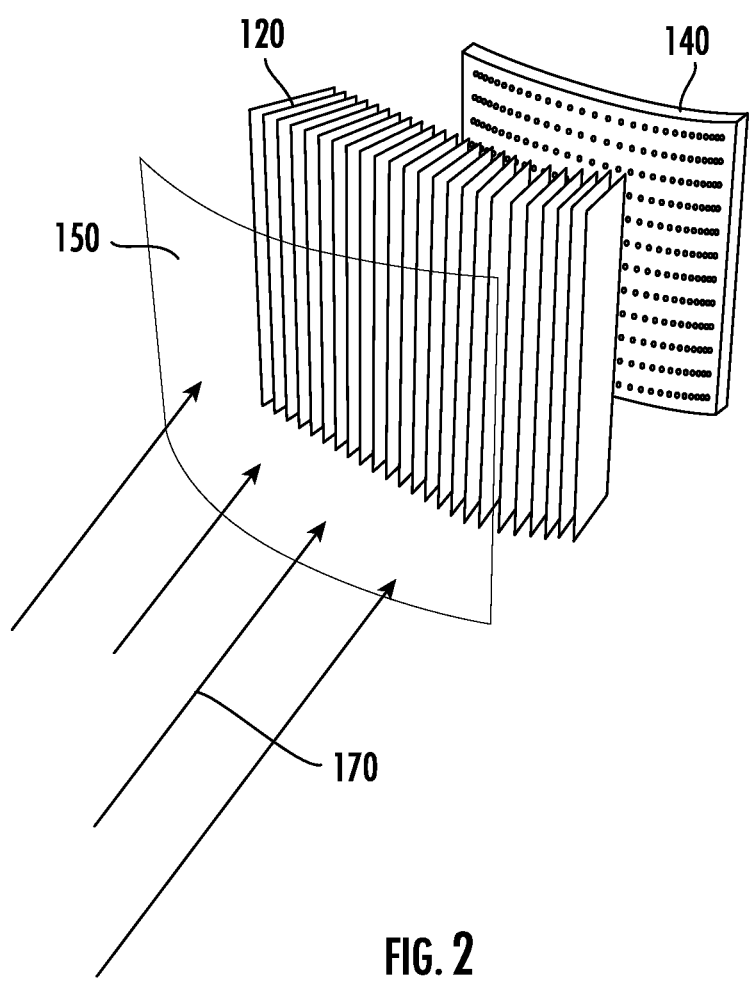
FIG. 2 is an exploded view of a portion of the filter shown in FIG. 1, in accordance with one aspect of the disclosure.

Referring again to FIG. 1, the sensor 140 is disposed within the housing 110, in some embodiments inside of the filter 120 as shown in FIG. 2. The sensor 140 may be configured to monitor at least one of a particle size of dust in the airflow 170, an accumulation of dust on a surface of the filter 120, and a pressure drop across the filter 120. The sensor detection method may rely on light transmitted from the sensor 140, backscattered from the surface of the filter 120 and received back at sensor 14 to determine an accumulation of dust on a surface of the filter. The sensor may send and receive one or more colors to improve the accuracy. It should be appreciated that the particle size may include particle concentration or particle concentration of a certain particle size range. The particle size range may be, for example, in the range of 1 μm to 25 μm. A refined particle size range may be between 5 μm to 10 μm.

The sensor 140 communicates collected data to a controller 180 of the air cleaning system 100 located in the housing 110. The controller 180 may use this collected data to determine dust accumulation and concentration on the filter 120 (e.g., by monitoring for changes in backscattered light intensity). Pressure drop in the filter 120 may be related to sensor data using a correlation table. The controller 180 may compare the data transmitted from the sensor 140 to a preselected threshold (e.g., to determine whether or not a threshold amount of dust accumulation on the filter 120 has occurred). It should be appreciated that the controller 180 may compare a rate at which dust accumulation on the filter 120 has occurred in certain instances (e.g., amount of dust accumulation over a given time period, which may be compared to a threshold rate). The result of the comparison may be transmitted to a user device 200 (e.g., mobile phone, tablet, computer system, etc.) via a wireless signal. The user device 200 may display or alert a user to the result of the comparison, and if the threshold is exceeded. While in some embodiments, the comparison is performed by the controller 180, in another embodiment the data is transmitted from the sensor 140 to the user device 200, and the user device 200 performs the comparison through, for example, an application ("app") installed to the user device 200. Additionally or alternatively, the result of the comparison may be displayed at the housing 110 at a housing display 210 operably connected to the controller 180.

Depending on the result of the comparison, the wireless signal may be used inform a person (e.g., homeowner, maintenance staff, etc.) that a certain amount of dust has been within the space by, for example a message and/or displayed color or audible alert. This wireless signal may be used encourage the person to clean (e.g., dust, etc.) the room. It should be appreciated that in certain instances the wireless signal may also be used to inform the person that the filter 120 is in need of cleaning and/or replacement. The wireless signal can also be monitored to identify frequency of cleaning of the room and/or frequency or duration of operation of the air cleaning system 100 and make recommendations based on the observed frequency of the alarm. The recommendations may include adjusting the period that the wireless signal is to be transmitted encouraging cleaning and the replacement of filter 120 is needed.

Figure 3:
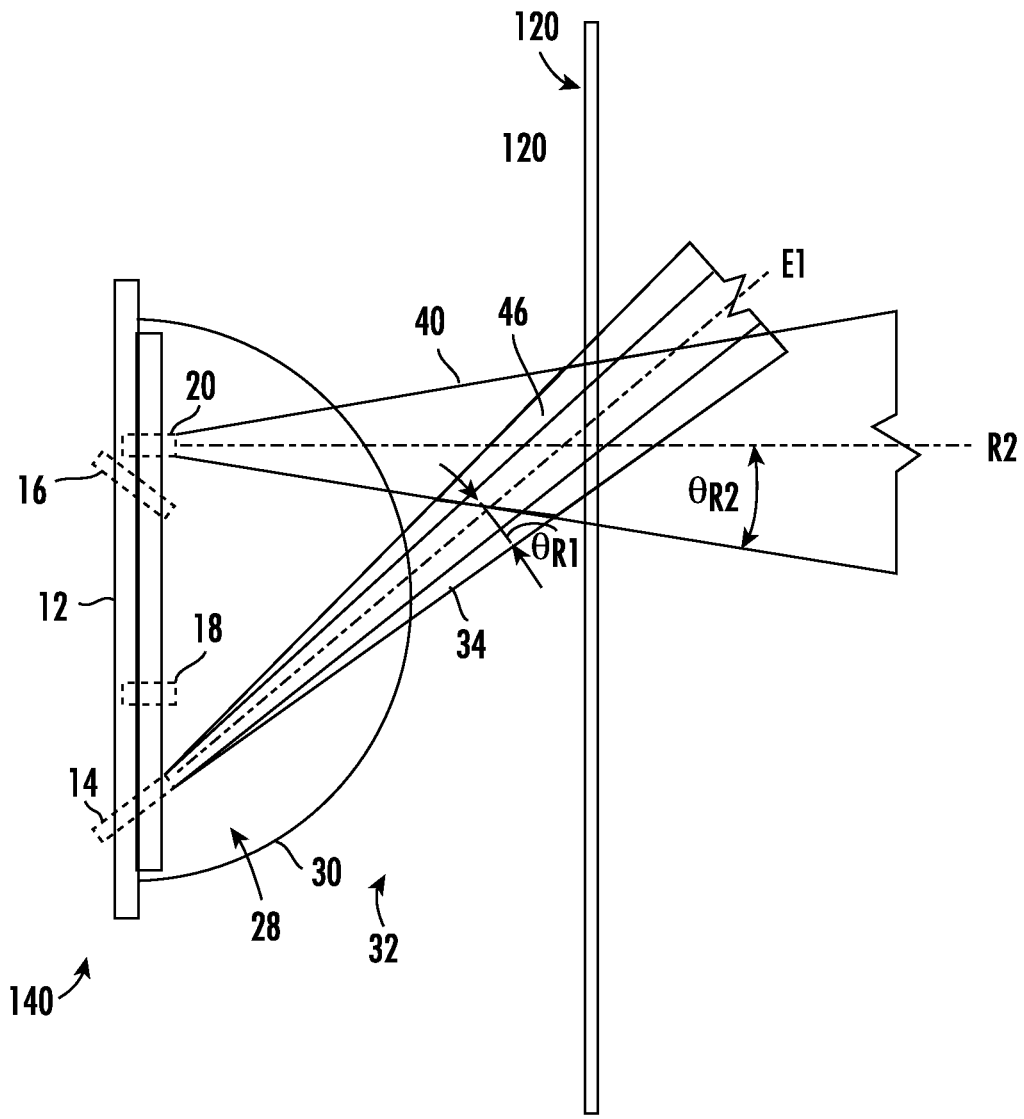
FIG. 3 is a cross-sectional side view of an exemplary sensor, depicting the monitoring of the accumulation of dust on a surface of a filter, in accordance with one aspect of the disclosure.

FIG. 3 depicts a cross-section side view of an exemplary sensor 140, showing the monitoring of the accumulation of dust on a surface of a filter. It should be appreciated that the sensor 140 may be any device capable of monitoring at least one of a particle size, an accumulation of dust on a surface of the filter 120, and a pressure drop over the filter 120. As shown in FIG. 3, the sensor 140 may be an optical point sensor in certain instances. For example, the sensor 140 may include one or more emitters 14 and one or more detectors 20. The emitter(s) 14 may transmit light toward a surface of the filter 120. The light may be collected by the detector(s) 20 as the light is scattered by the filter 120. The light scattering may be used to detect the buildup of dust and trapped particulates on the filter surface, which changes the light detected by the detector(s) 20. In some embodiments, the emitters 14 may be configured to transmit light at more than one frequency or color, for example ultraviolet (UV) light, infrared (IR) light and/or blue visible light. Emitting light in different colors allows for aiding in detection of multiple types of particulates. The sensor 140 may include a processor (e.g., a microprocessor), which may be configured to receive electrical signals from the detector(s) 20. The processor may analyze the signal against a threshold or machine learning algorithm to determine the presence of dust on the filter 120. The frequency and magnitude of the light scattering can be used to determine at least one of: filter change interval, frequency of dusting in a home or room, effectiveness of the filter to a particular pollutant, and categorization of the pollutant based on the captured particles. As mentioned above, this information may be transmitted via a wireless signal from the air cleaning system 100 to the user device 200.

The use of the terms "a" and "and" and "the" and similar referents, in the context of describing the invention, are to be construed to cover both the singular and the plural, unless otherwise indicated herein or cleared contradicted by context. The use of any and all example, or exemplary language (e.g., "such as", "e.g.", "for example", etc.) provided herein is intended merely to better illuminate the invention and does not pose a limitation on the scope of the invention unless otherwise claimed. No language in the specification should be construed as indicating any non-claimed elements as essential to the practice of the invention.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air cleaning system comprising:
a housing comprising an inlet and an outlet;
a filter disposed within the housing, downstream of the inlet;
a fan assembly disposed within the housing, the fan assembly in airflow communication with the filter; and
a sensor disposed within the housing, the sensor configured to monitor at least one of a particle size, an accumulation of dust on a surface of the filter, and a pressure drop over the filter;
wherein a result of a comparison between a measured dust level at the filter and a dust threshold is communicated to a user;
wherein the result of the comparison includes one or more recommendations for the user;
wherein the one or more recommendations include at least one of: changing a frequency of cleaning a room in which the air cleaning system is located, or changing operation of the air cleaning system;
wherein the filter is cylindrical; and
wherein the sensor is disposed inside the cylindrical filter.

2. The air cleaning system of claim 1, wherein the result of the comparison is transmitted to a user device via a wireless signal.

3. The air cleaning system of claim 2, wherein the user device is one of a smart phone or tablet.

4. The air cleaning system of claim 1, wherein the fan assembly is disposed in the housing downstream of the filter.

5. The air cleaning system of claim 1, wherein the filter is one of a spun glass or fiberglass filter, a pleated filter formed from for example cotton or nylon, a high-efficiency particulate air (HEPA) filter, an ultraviolet (UV) light filter, or an electrostatic filter.

6. The air cleaning system of claim 1, wherein the sensor is an optical point sensor.

7. The air cleaning system of claim 6, wherein the optical point sensor is configured to emit light at multiple wavelengths.

8. A method of operating an air cleaning system, comprising:
urging an airflow from a room through a filter disposed in a housing;
accumulating dust from the airflow on the filter;
sensing a level of dust accumulation on the filter via a sensor;
comparing the level of dust accumulation to a threshold;
making one or more recommendations for cleaning of the room and/or operation of the air cleaning system based on the comparison;
wherein the one or more recommendations include at least one of: changing a frequency of cleaning a room in which the air cleaning system is located, or changing operation of the air cleaning system;
wherein the filter is cylindrical; and
wherein the sensor is disposed inside the cylindrical filter.

9. The method of claim 8, wherein the one or more recommendations are transmitted to a user device via a wireless signal.

10. The method of claim 9, wherein the user device is one of a smart phone or tablet.

11. The method of claim 8, wherein the sensing the level of dust includes:
emitting light from one or more emitters of a sensor toward the filter;
receiving a scattered light signal from the filter at one or more detectors of the sensor; and
analyzing the scattered light signal at the processor.

12. The method of claim 11, wherein the sensor detects one or more of a particle size, an accumulation of dust on a surface of the filter, and a pressure drop over the filter.

13. The method of claim 8, wherein the filter is one of a spun glass or fiberglass filter, a pleated filter formed from for example cotton or nylon, a high-efficiency particulate air (HEPA) filter, an ultraviolet (UV) light filter, or an electrostatic filter.

* * * * *